US009747429B2

(12) United States Patent
McFarland

(10) Patent No.: US 9,747,429 B2
(45) Date of Patent: *Aug. 29, 2017

(54) PERSONAL FAMILIARITY AUTHENTICATION

(71) Applicant: ADP, LLC, Roseland, NJ (US)

(72) Inventor: Alan David McFarland, Middletown, NJ (US)

(73) Assignee: ADP, LLC, Roseland, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,819

(22) Filed: Jan. 3, 2017

(65) Prior Publication Data

US 2017/0147806 A1 May 25, 2017

Related U.S. Application Data

(63) Continuation of application No. 14/803,028, filed on Jul. 18, 2015, now Pat. No. 9,552,471.

(51) Int. Cl.
*G06F 21/32* (2013.01)
*G06F 21/36* (2013.01)
(Continued)

(52) U.S. Cl.
CPC .............. *G06F 21/32* (2013.01); *G06F 21/36* (2013.01); *G06K 9/00288* (2013.01);
(Continued)

(58) Field of Classification Search
CPC ...................................................... G06F 21/32
See application file for complete search history.

(56) References Cited

U.S. PATENT DOCUMENTS 5,774,591 A * 6/1998 Black ................. G06K 9/00315
382/118
5,787,186 A * 7/1998 Schroeder .......... G06K 9/00221
235/380
(Continued)

FOREIGN PATENT DOCUMENTS

WO WO2013170023 A1 11/2013

OTHER PUBLICATIONS

Turk et al.; Face recognition using eigenfaces; Published in: Computer Vision and Pattern Recognition, 1991. Proceedings CVPR '91., IEEE Computer Society Conference on; Date of Conference: Jun. 3-6, 1991; IEEE Xplore.*
(Continued)

*Primary Examiner* — Bradley Holder
(74) *Attorney, Agent, or Firm* — Yee & Associates, P.C.

(57) ABSTRACT

A method for computer security. A gallery comprising a first identity of a first human person is maintained, the first identity associated with a plurality of tags, with first properties, useful for identifying the first human person. A first Internet search for facial images of the first human person is performed using the plurality of tags. A first facial image is selected from the results of this search. A second Internet search is performed for facial images of other human persons based on second properties that are generated by modifying the first properties of the plurality of tags. A plurality of additional facial images of the other human persons retrieved by the second Internet search is selected. A palette of randomized facial images including the first facial image together with the plurality of additional facial images is presented. Access is denied unless the correct facial image is selected.

18 Claims, 6 Drawing Sheets

(51) Int. Cl.
  *H04L 29/06* (2006.01)
  *G06K 9/00* (2006.01)
  *G06F 3/0484* (2013.01)
  *G06F 3/0481* (2013.01)

(52) U.S. Cl.
  CPC .............. *H04L 63/08* (2013.01); *H04L 63/10* (2013.01); *G06F 3/04817* (2013.01); *G06F 3/04842* (2013.01)

(56) References Cited

U.S. PATENT DOCUMENTS

| | | | | |
|---|---|---|---|---|
| 5,802,220 A * | 9/1998 | Black | | G06K 9/00248 382/100 |
| 5,842,194 A * | 11/1998 | Arbuckle | | G06K 9/6857 382/224 |
| 5,991,429 A * | 11/1999 | Coffin | | G06K 9/00255 382/118 |
| 6,041,412 A * | 3/2000 | Timson | | G06F 21/32 713/180 |
| 6,745,520 B2 * | 6/2004 | Puskaric | | E05G 5/003 49/142 |
| 6,765,470 B2 * | 7/2004 | Shinzaki | | G06F 21/32 235/380 |
| 6,850,147 B2 * | 2/2005 | Prokoski | | G06K 9/00885 340/5.52 |
| 6,999,606 B1 * | 2/2006 | Frischholz | | G06K 9/00228 382/118 |
| 7,043,643 B1 * | 5/2006 | Doe | | G06F 21/34 713/186 |
| 7,088,220 B2 * | 8/2006 | Kotzin | | G07C 9/00142 340/5.52 |
| 7,106,902 B2 * | 9/2006 | Nakazawa | | G07C 9/00087 382/182 |
| 7,183,895 B2 * | 2/2007 | Bazakos | | G06K 9/00228 235/375 |
| 7,260,726 B1 * | 8/2007 | Doe | | G06F 21/34 380/228 |
| 7,293,699 B2 * | 11/2007 | Jenkins | | G06Q 20/1085 235/379 |
| 7,523,069 B1 * | 4/2009 | Friedl | | B23K 9/32 219/78.01 |
| 7,636,365 B2 * | 12/2009 | Chang | | H04L 67/12 370/401 |
| 7,836,437 B2 * | 11/2010 | Kacmarcik | | A63F 13/10 717/139 |
| 7,859,551 B2 | 12/2010 | Bulman et al. | | |
| 8,768,313 B2 | 7/2014 | Rodriguez | | |
| 8,811,692 B2 | 8/2014 | Prokoski | | |
| 8,873,851 B2 * | 10/2014 | Fedorovskaya | ... | G06F 17/30247 382/170 |
| 9,014,509 B2 * | 4/2015 | Fedorovskaya | | G06Q 50/01 382/305 |
| 9,183,224 B2 * | 11/2015 | Petrou | | G06F 17/30244 |
| 9,552,471 B1 | 1/2017 | McFarland | | |
| 2005/0043897 A1 | 2/2005 | Meyer | | |
| 2006/0251338 A1 | 11/2006 | Gokturk et al. | | |
| 2008/0005578 A1 | 1/2008 | Shafir | | |
| 2012/0114192 A1 | 5/2012 | Bladel et al. | | |
| 2012/0165046 A1 | 6/2012 | Rhoads et al. | | |
| 2013/0167085 A1 | 6/2013 | Roundtree et al. | | |

OTHER PUBLICATIONS

Zhao et al.; Face recognition: A literature survey; Published in: Journal ACM Computing Surveys (CSUR) Surveys Homepage archive; vol. 35 Issue 4, Dec. 2003; pp. 399-458; ACM Digital Library.*
Turk et al., "Face Recognition Using Eigenfaces", IEEE Computer Society on Computer Vision and Pattern Recognition, 1991, 6 pages.
Zhao et al., "Face Recognition: A Literature Survey", ACM Computing Surveys (CSUR), vol. 35, Iss. 4, Dec. 2003, 61 pages.

* cited by examiner

US 9,747,429 B2

PERSONAL FAMILIARITY AUTHENTICATION

This application is a continuation application of U.S. patent application Ser. No. 14/803,028, filed Jul. 18, 2015.

BACKGROUND INFORMATION

1. Field

The present disclosure relates to methods and devices for creating special purpose computers whose hardware and programming enable more secure and rapid authentication for purposes of computer security.

2. Background

Constantly evolving threats to computers and data give rise to a desire for improved computer and data security and improved user authentication techniques. However, as with any other form of security, a trade-off is often necessary between convenience of access to a secured computer resource and the security of such secured computer resource. Thus, security and authentication techniques which are both secure and convenient are highly desirable.

As used herein, the term "secured computer resource" refers to any computer resource that is secured. "Secured" or "security" means that one or more challenges must be passed in order to access some or all of the desired computer resources. Examples of computer resources include access to a computer's hardware, access to a computer's software, access to data stored a computer, access to software or data on a remote computer connected via a network, and the like. Examples of security include passwords, physical keys, biometric locks, and the like. These examples are not exhaustive and thus do not necessarily fully limit the term "secured computer resource."

SUMMARY

The illustrative embodiments provide for a method. The method includes maintaining, using a computer, a gallery comprising a first identity of a first human person, the first identity associated with a plurality of tags useful for identifying the first human person, the plurality of tags having first properties. The method also includes, responsive to a request to access at least one of the computer, software usable by the computer, or data accessible by the computer, the computer performing a first Internet search for facial images of the first human person using the plurality of tags, wherein prior to the first Internet search no facial images are stored by the computer. The method also includes selecting, by the computer, a first facial image from results retrieved by the first Internet search. The method also includes performing, by the computer, a second Internet search for facial images of other human persons based on second properties that are generated by modifying the first properties of the plurality of tags. The method also includes selecting, by the computer, a plurality of additional facial images of the other human persons retrieved by the second Internet search. The method also includes presenting, on a tangible display, a palette of randomized facial images including the first facial image together with the plurality of additional facial images. The method also includes, responsive to selection of the first facial image from the palette, granting the request to access. The method also includes, responsive to selection of any of the plurality of additional facial images from the palette, denying the request to access.

The illustrative embodiments also provide for a data processing system. The data processing system includes a processor, a bus connected to the processor, and a non-transitory computer readable storage medium connected to the bus, the non-transitory computer readable storage medium storing computer usable program code which, when executed by the processor, performs a method implemented by the data processing system. The computer usable program code includes computer usable program code for maintaining, using a computer, a gallery comprising a first identity of a first human person, the first identity associated with a plurality of tags useful for identifying the first human person, the plurality of tags having first properties. Also included is computer usable program code for, responsive to a request to access at least one of the computer, software usable by the computer, or data accessible by the computer, the computer performing a first Internet search for facial images of the first human person using the plurality of tags, wherein prior to the first Internet search no facial images are stored by the computer. Also included is computer usable program code for selecting, by the computer, a first facial image from results retrieved by the first Internet search. Also included is computer usable program code for performing, by the computer, a second Internet search for facial images of other human persons based on second properties that are generated by modifying the first properties of the plurality of tags. Also included is computer usable program code for selecting, by the computer, a plurality of additional facial images of the other human persons retrieved by the second Internet search. Also included is computer usable program code for presenting, on a tangible display, a palette of randomized facial images including the first facial image together with the plurality of additional facial images. Also included is computer usable program code for, responsive to selection of the first facial image from the palette, granting the request to access. Also included is computer usable program code for, responsive to selection of any of the plurality of additional facial images from the palette, denying the request to access.

The illustrative embodiments also provide for anon-transitory computer readable storage medium storing computer usable program code which, when executed by a computer, performs a computer implemented method. The computer usable program code includes computer usable program code for maintaining, using a computer, a gallery comprising a first identity of a first human person, the first identity associated with a plurality of tags useful for identifying the first human person, the plurality of tags having first properties. Also included is computer usable program code for, responsive to a request to access at least one of the computer, software usable by the computer, or data accessible by the computer, the computer performing a first Internet search for facial images of the first human person using the plurality of tags, wherein prior to the first Internet search no facial images are stored by the computer. Also included is computer usable program code for selecting, by the computer, a first facial image from results retrieved by the first Internet search. Also included is computer usable program code for performing, by the computer, a second Internet search for facial images of other human persons based on second properties that are generated by modifying the first properties of the plurality of tags. Also included is computer usable program code for selecting, by the computer, a plurality of additional facial images of the other human persons retrieved by the second Internet search. Also included is computer usable program code for presenting, on a tangible display, a palette of randomized facial images including the first facial image together with the plurality of additional facial images. Also included is computer usable program code for, responsive to selection of the first facial image from the palette, granting the request to access. Also included is computer usable program code for, responsive to selection of any of the plurality of additional facial images from the palette, denying the request to access.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
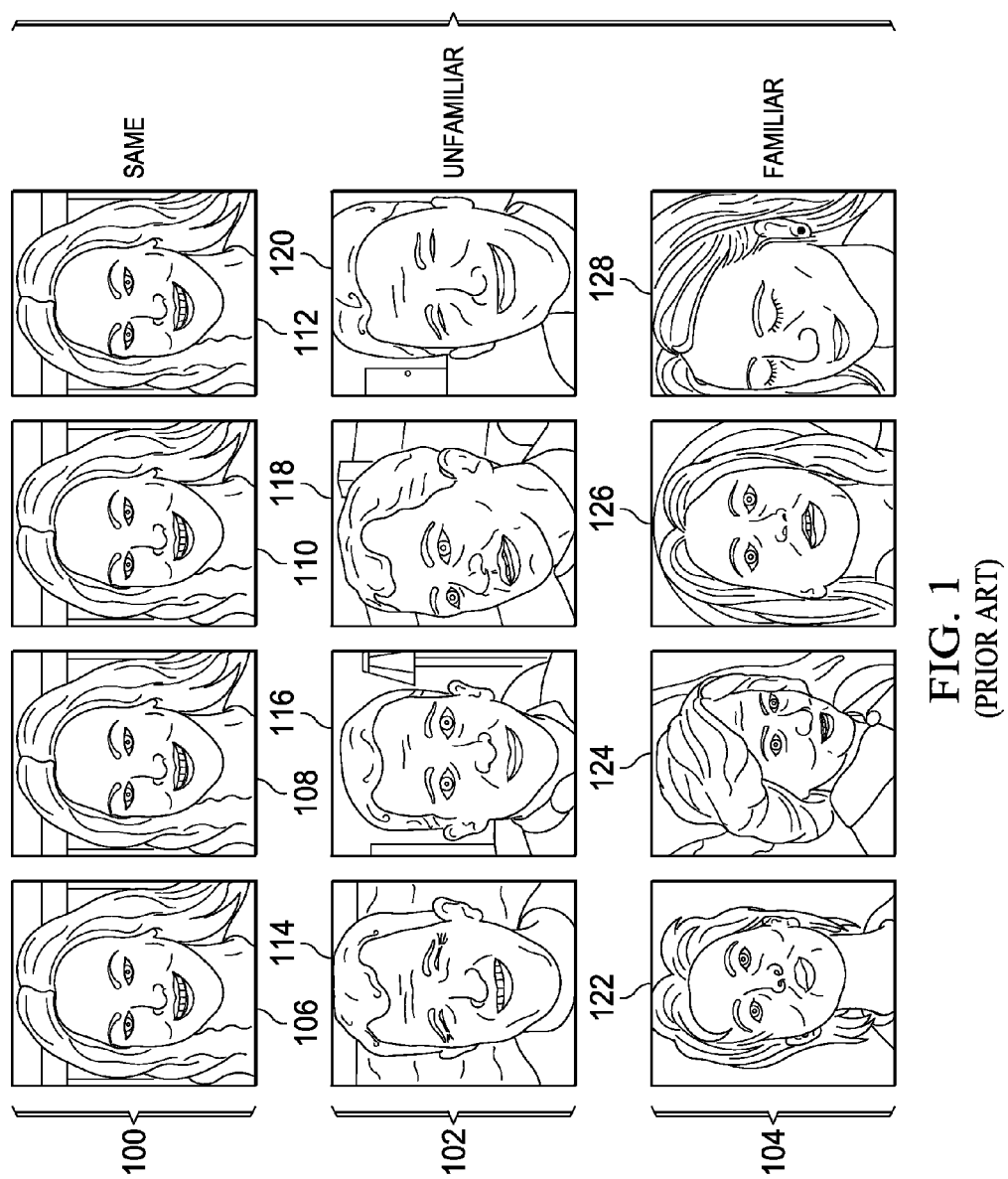
FIG. 1 is a prior art illustration of faces of human persons used for purposes of describing a principle of a typical human's ability to recognize faces of other humans, in accordance with an illustrative embodiment.

The illustrative embodiments recognize and take into account that research into facial recognition has shown the effectiveness of familiarity based graphical authentication. Thus, the illustrative embodiments provide for serving initial person images for a user to pick as "password" from the web or cloud based on rules. These rules may include a person image's relative low familiarity level to the general population and a person image's relative high likelihood of familiarity to the user. Once an image is picked by the user, the image is not stored. Rather, the image characteristics, including the identity of the person who is on that image, are stored. At log in, the system serves a set of images pulling from web or cloud in real time, including at least one image matching the identity of the person image previously selected and a set of distractors.

The illustrative embodiments recognize and take into account that using the capability of a human user to correctly select familiar faces has been used for computer security in the past. In other words, previous authentication paradigms have used recognition of a facial target amongst distractor facial images. However, the illustrative embodiments have several major differences from prior use of facial familiarity as a tool for computer security. For example, prior systems store and use the actual image of a person and then present that image among distractor images for selection by the user. However, this method is less secure than desired because the same facial image is always presented to the user for recognition.

Thus, the illustrative embodiments recognize and take into account that end user selection of authentication targets may be based on personal familiarity with a human person, not a specific image of a person. In previous approaches to facial recognition authentication, the end user was constrained to selection of individual facial images as authentication targets, provided from a fixed pool of stored images.

In contrast, the illustrative embodiments have the end user identify a target person by name, based on their personal familiarity with that target person. The system then guides the end user to optimal target person definition, ensuring that the proposed target is relatively unfamiliar to others. This result is accomplished by real-time web search for that person's name, and deriving a "familiarity" score. The familiarity score may be a measure of how many other people are familiar with the person. For example, many people may be familiar with the face of a former President of the United States of America, who would have a very high familiarity score, though only a few people may be familiar with the face of an ordinary citizen, who may have a very low familiarity score.

Based on a system tunable threshold value of the familiarity score, the system indicates whether or not the proposed target will meet a password strength necessary. The term "password strength" is a numerical assessment of the difficulty of recognizing a face based on the familiarity score. A proposed target that meets the minimum password strength, that is a low enough familiarity score, is then used to display facial image examples for that target. User selection of a target image causes the system to derive a template of facial tags, which are then stored for later use during future authentication trials.

Prior to this process, the end user may create a "gallery" of target persons, large enough to allow for subset sampling during multiple authentication trials. The system may present a distinct image of one of these target persons, plus distractor images of similar persons, all based on real-time searches. The more images that are in the gallery, the more potential people's faces that may be used to search and used for authentication.

In summary, during each authentication trial, the set of target and distractor facial images are also constructed in real time, rather than being drawn from a stored set of images. A target person is selected at random from the end user's gallery; the stored template values are then used in a web image search to retrieve an exemplar image of the target person, along with a set of distractor facial images that match on a subset of the template value set.

Thus, the illustrative embodiments provide a more robust and secure authentication approach over previous facial recognition methods. Some of the advantages of the illustrative embodiments over the known security systems that use facial recognition include the following. First, guided selection of personally familiar people is used for authentication targets, rather than memorization of a fixed facial image. This feature improves the memorability of the target over time. This feature would be especially important for end users with infrequent log in attempts. This approach to target selection also decreases the potential for guessing attacks due to potential user choice of common facial patterns, such as choosing same gender, culture/race. Using personally familiar persons, and relatively unfamiliar persons to others, helps to increase password strength. In a specific example, over the shoulder attack is mitigated by use of the keyboard to uniquely identify the target image in a matrix of images, thereby preventing an observer the ability to see directly the end user's target selection by pointer click or screen tap.

The illustrative embodiments also have other advantages relative to the known art. For example, creation of target/distractor matrices in real time reduces storage requirements for the authentication solution. Using a random sampling of targets for authentication trials, and real time retrieval of target and distractor images increases the difficulty of both online and offline attacks. The illustrative embodiments also rely on the ability of most humans to recognize familiar faces, and thus are convenient and also solve problems with forgetting a complex, strong alphanumeric password. The illustrative embodiments also may save a large enterprise money by reducing calls to a service center to reset a forgotten alphanumeric username and/or password.

FIG. 1 is a prior art illustration of faces of human persons used for purposes of describing a principle of a typical human's ability to recognize faces of other humans, in accordance with an illustrative embodiment. FIG. 1 shows three rows of images of human faces, row 100, row 102, and row 104. Each image in a given row shows four images of the same person, but a different person is shown among the rows.

Thus, for example, row 100 shows four images of faces of a first person, facial image 106, facial image 108, facial image 110, and facial image 112. All four of these facial images are the same and are of the same person. It is well known that most human persons can quickly recognize that facial image 106 through facial image 112 are the same, even though there are a large number of aspects of a face that have to be compared. For example, for a computer to compare facial image 106 through facial image 112 to each other and produce a result that correctly concludes that these four images are the same, the computer would have to compare many different aspects of the faces, such as the distance between eyes, eye shape, nose shape, nose placement, mouth shape, mouth placement, forehead slope, hair, and possibly many other aspects of the facial images. However, most human persons can nearly instantly recognize that facial image 106 through facial image 112 are exactly the same.

However, the task of recognizing different facial images as belonging to the same person becomes more difficult, sometimes very difficult, for a human evaluator if the images are sufficiently different from each other and also the person is unfamiliar to the human evaluator. Both factors are important to the difficulty of determining that different facial images belong to the same person: first, the degree of difference between the images, and second, the degree of familiarity of the person to the human evaluator. For example, most human persons can instantly recognize a parent or caregiver, even if there are large differences between the images, such as for example facial images taken decades apart in time in different lighting and with different facial positions. However, if the person is unfamiliar, then making the same recognition among different facial images having a similar degree of difference may be extremely difficult for the average person.

Thus, for example, facial image 114, facial image 116, facial image 118, and facial image 120 in row 102 belong to the same person. However, this person is likely to be unfamiliar to all but a few individuals, as this person does not have widespread notoriety. All four of facial image 114, facial image 116, facial image 118, and facial image 120 have substantial differences, as the backgrounds are different. Additionally, facial image 120 is more blurry than the other facial images. Further, facial image 114 shows the person squinting whereas the other facial images show the person not squinting. Yet further, the smiles are different among the different facial images. Accordingly, most humans evaluators who are unfamiliar with the person depicted in the images of row 102 would find it difficult to tell that facial image 114 through facial image 120 belong to the same person, particularly if distractor images were also displayed at the same time.

Nevertheless, if the human evaluator is viewing facial images of a familiar person, then the human evaluator can often easily tell that different images belong to the same person. Thus, for example, facial image 122, facial image 124, facial image 126, and facial image 128 in row 104 are all facial images of Hillary Rodham Clinton. Hillary Rodham Clinton is a person whose face is familiar to tens of millions of people on account of her public service. To a person who is familiar with the face of Hillary Rodham Clinton, deciding that facial image 122 through facial image 128 are all facial images of Hillary Rodham Clinton is relatively simple and fast, even given the great disparities among the four facial images. For example, many years have passed between facial image 122 and facial image 124, the hair color has changed somewhat between facial image 122 and the other facial images, and facial image 124 looks down whereas facial image 122 and facial image 126 look up, and facial image 128 looks to a side of the image. Many other differences exist among facial image 122 through facial image 128. Nevertheless, most people who are familiar with the face of Hillary Rodham Clinton could readily evaluate that facial image 122 through facial image 128 all belong to the same person: Hillary Rodham Clinton.

Overall, the differences among facial image 122 through facial image 128 are much greater than the differences among facial image 114 through facial image 120. Nevertheless, if the person shown in row 104 is familiar to the human evaluator, then most human evaluators would readily recognize that facial image 122 through facial image 128 all belong to the same person. On the other hand, assuming the person shown in row 102 was not familiar to the human evaluator, then most human evaluators would not be able to readily recognize that facial image 114 through facial image 120 all belong to the same person. This result tends to hold even though the differences between the facial images in row 102 are substantially less than the differences between the facial images in row 104.

The difficulty of the challenge of recognizing multiple images as belonging to the same person increases if distractor images are also presented to the human evaluator. This increase in difficulty is especially great if the person shown in the different facial images is unfamiliar to the human evaluator. However, if the person shown is familiar to the human evaluator, the challenge of recognizing two or more different images as belonging to the same person is relatively simple, even across ethnic differences. The more familiar the human evaluator is with a pre-selected person shown in a set of images, the higher the probability the human evaluator will correctly select facial images of the pre-selected person from a group of distractor images.

In summary, it is well known that human evaluators are very good at identifying different facial images as belonging to the same person when the depicted person is familiar to the human evaluator, even when those facial images are very different. Likewise, it is well known that human evaluators are not good at identifying different facial images as belonging to the same person when the depicted person is unfamiliar to the human evaluator, even if the differences among the facial images are not great. The illustrative embodiments take advantage of this principle in new and novel manners.

Others have attempted to take advantage of this principle in the field of computer security. For example, it is known for a user to store a pre-selected image of a known human person. When access to a secure computer resource is desired, then the user is challenged by presenting that pre-selected image along with a number, perhaps several dozen, distractor images. Access to the secure computer resource is granted if the user successfully selects the pre-selected image from the number of distractor images. However, this technique is not optimal, as the pre-selected image is always the same and thus vulnerable to a so-called "over-the-shoulder attack" where the image is observed by a third person and then misused to gain access. Additionally, forcing the user to select a specific image of a person, for later use in authentication, requires that user memorize the picture, not the person. At a minimum, this technique would likely increase the amount of training time spent during security set-up. Still further, security is lessened by always using the same image. The illustrative embodiments recognize and take into account these disadvantages.

Figure 2:
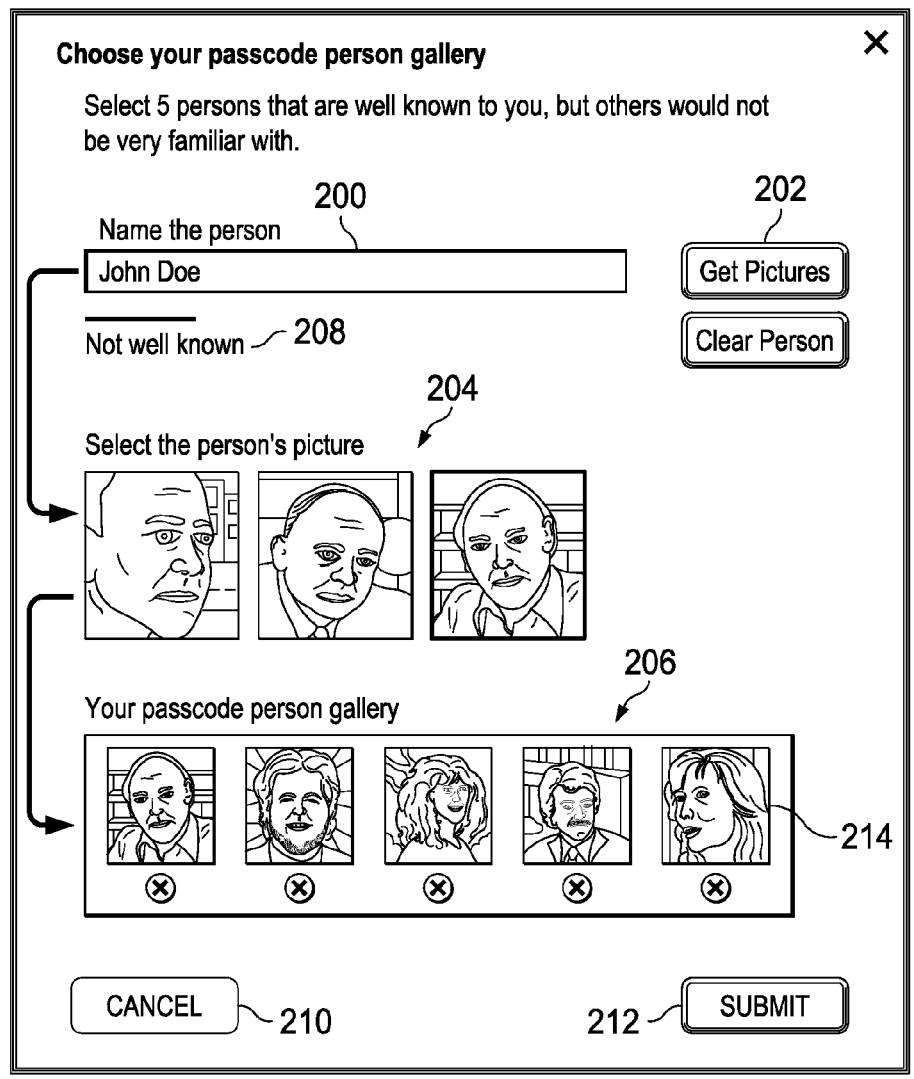
FIG. 2 is an illustration describing selection of persons that will be used as persons to be recognized by an authorized user, in accordance with an illustrative embodiment.

FIG. 2 is an illustration describing selection of persons that will be used as persons to be recognized by an authorized user, in accordance with an illustrative embodiment. FIG. 2 may represent a first step in establishing a computer security scheme to secure computer resources, in accordance with an illustrative embodiment. The techniques described with respect to FIG. 2 may be implemented by a data processing system, such as data processing system 600 of FIG. 6. As used herein the term "the system" may refer to some or all of such a data processing system, including data processing system 600 of FIG. 6.

A first step to securing a computer resource according to the illustrative embodiments may be to select familiar individuals whom the user is readily able to recognize. Such familiar persons may be termed pre-selected persons. Note that an image of the pre-selected person need not be selected, at least not initially. Rather the user provides the identity of the pre-selected person. The identity of the pre-selected person may be established as simply as providing a name of the pre-selected person. Thus, for example, a user may be prompted to enter the name of a person in prompt 200. The illustrative embodiments are not limited to names, as other methods may be used to identify a person. Such other methods may include a social security number, employee number, student identification, an image, a professional identification number, or any other suitable means for uniquely identifying an individual.

Optionally, to ensure that the system has identified the person intended by the user, the system may prompt the user to present pictures of the identified person. For example, the user may actuate "get pictures" button 202. In response, the system may search the Internet or one or more suitable databases for images of the identified person. The system may then present one or more pictures of the identified person in display area 204. The user may inform the system that the correct person is displayed by selecting a confirm button, or some other suitable means, at which point the person is added to passcode gallery 206 described below.

Optionally, all images presented in display area 204 may be images of the same person. In this manner the user may be sure that the person identified by the system is the intended pre-selected person.

Optionally, to ensure that the user may identify the pre-selected person from distractor images, the system may identify facial image characteristics of the identified person and then search for different people with similar but different facial image characteristics. The system may then present one or more distractor images along with an image of the selected person. If the user correctly selects the image of the identified person from the distractor images, then the identified person is added to passcode gallery 206 described below.

Optionally, for added security, the system may determine a familiarity score for the identified person. The term "familiarity score" refers to a numerical value that represents how many people may consider the identified person to be familiar. This score may be as simple as the number of hits obtained on the identified person as a result of an Internet search on that person. This score may also be an amalgam of factors, policies, and/or rules. For example, certain people may be excluded from being a pre-selected person on account of their fame and recognizability to many people. Thus, for example, policies or rules may be put into place that forbid a user from selecting as a pre-selected person named celebrities, political figures, or religious leaders, meaning that such people automatically receive a very high familiarity score. In another example, multiple different searches in different databases or multiple different search tools on the same person on the Internet may return different results, with these results averaged with each other according to some pre-determined formula. In any case, a familiarity score is assigned to the identified person.

The familiarity score is then compared to a familiarity threshold. The familiarity threshold is a value to which the familiarity score is compared. If the familiarity score is less than the familiarity threshold, then it is assumed that the identified person is recognizable by few enough individuals that it is likely only the user could identify different facial images of the pre-selected person. If the familiarity score is greater than the familiarity threshold, then the user is informed that the identified individual may not be used in passcode gallery 206. Optionally, the user may be required to select another individual.

Passcode gallery 206 is a list of pre-selected individuals that may be used to generate a challenge presented to a user upon a request to access a secured computer resource, according to the illustrative embodiments. Typically, the system may select any one person from passcode gallery 206 for use in generating the challenge, as described with respect to FIG. 3. However, in some illustrative embodiments, multiple people from the passcode gallery 206 could be used, with different images of the multiple people used in the challenge.

The size of passcode gallery 206 may vary. For example, FIG. 2 shows that the identities of five individuals have been stored in passcode gallery 206, though the identities of more or fewer individuals may be present. These identities may be displayed in the form of facial images, as shown in FIG. 2, though the identities may be displayed using other methods. For example, passcode gallery 206 could be a list of names, a list of social security numbers, a list of other alphanumeric identifiers, or a list of nicknames or pseudonyms. Thus, the illustrative embodiments are not necessarily limited to the specific implementation shown in FIG. 2.

Other optional features may be presented to the user. For example, the familiarity score and its relation to the familiarity threshold may be displayed to the user in display area 208. In FIG. 2, this relationship is made easily recognizable to the user with an indication that the identified person is "not well known" with a green bar indicating that the identified person is likely a good candidate for addition to passcode gallery 206. If the person were well known, or had a familiarity score above the familiarity threshold, then a red bar and a warning might displayed instead. In other illustrative embodiments, other representations are possible, such as for example to directly display the values of the familiarity score and/or the familiarity threshold.

Other features may be present. For example, if a user desires to start the process of selection over again, the user could select cancel button 210. If a user is comfortable with the final passcode gallery, then the user could select submit button 212. In some illustrative embodiments, submit button 212 may be unselectable by the user, for example greyed-out, until the minimum number of people with desirable familiarity scores are present in passcode gallery 206. The process of generating an acceptable passcode gallery 206 may be referred to as "enrollment" or "setup." Ultimately, the facial images of a number of individuals, such as facial image 214, are displayed in passcode gallery 206. Each such facial image represents the identity of a single person who may be used when generating a challenge palette, as described with respect to FIG. 3.

Attention is now turned to an exemplary algorithm and details for how enrollment may be performed. This algorithm is exemplary only and does not necessarily limit the illustrative embodiments. More, fewer, or different steps may be used in a particular implementation.

In an illustrative embodiment, the user indicates a name, such as first name and last name, of the candidate gallery person. Next, the system performs a web search on the name string. A name string is the name parsed into an alphanumeric sequence, typically the letters of the name but possibly also including suffixes (such as numbers), prefixes (such as Mister or Miss), degree indications (such as Ph.D., Psy.D., M.D., J.D., or others), or titles (such as esquire, eminence, or others).

Next, the system returns a count of search hits returned. The system also returns a count of unique images mapping to the name string.

The count of search hits may be the familiarity threshold. Thus, the count of search hits may be compared to maximum allowed threshold value. If the count exceeds threshold, the candidate person is rejected from the passcode gallery. If the count is less than threshold value, the candidate person is accepted as a potential candidate for the passcode gallery. Rules or policies may still subsequently exclude the person from the passcode gallery, in some illustrative embodiments.

In an illustrative embodiment, the system may crop retrieved images to include head and upper shoulders. In this case, the system may display cropped images in a matrix. The user may select a single image from the matrix. The image is then included in the passcode gallery for easy recognition by the user.

Next, the system may develop person templates for individuals in the passcode gallery. The person templates are for use in generating challenges upon request for access to a computer resource. A "person template" is a description of a person, typically including many different descriptors, but possibly being as little as a single descriptor.

Thus, a person template is extracted from the image and/or is created based upon the image of the pre-selected individual. Note that properties of the image itself may be used as some of the descriptors in the person template, possibly in addition to facts retrieved from an Internet search of the pre-selected person.

The following is a partial list of descriptors that may be included in a person template. Some or all of these descriptors may be in a person template, and possibly different descriptors may be in the person template. Ultimately the system will use the information in the system template to generate effective challenges upon request to a secured computer resource, as described with respect to FIG. 3.

Descriptors in a person template may include facial image data from the image selected by the user. Such facial image data may be defined by ISO/IEC 19794 Information technology—Biometric data interchange formats Part 5, and extracted using appropriate image software. Descriptors may also include a person's first name, last name, suffix, prefix, title, age, gender, eye color, hair color, feature mask (such as glasses, a moustache, a beard, or others), feature point sets (such as the positions of eyes, nose, forehead, mouth, chin, and others), and the like. Other descriptors are also possible.

After the person template is generated, the person template is stored and then mapped to the end user profile data. In other words, the person template just generated is associated with the user who generated the pre-selected person. The person template is then added to the passcode gallery, which may be displayed simply as an image of the pre-selected person.

If more than one person is to be present in the passcode gallery, then the above process is repeated for one or more additional pre-selected people. Once a sufficient number of person templates are generated for the user's passcode gallery, with that number pre-determined or determined by the system, then the user is allowed to confirm the passcode gallery. The system is then ready for use to generate challenges when that particular user requests access to secured computer resources.

The illustrative embodiments described with respect to FIG. 2 may be further varied. For example, the setup of the passcode gallery may be a self-service registration as part of registering access to secured computer resources. In a specific non-limiting illustrative embodiment, the user may create a person gallery of six to eight different persons familiar to the user but familiar to perhaps a few others. For each person the system retrieves one or more facial images of that person based on a search of images of that person. If the number of hits of images of that person is above a certain threshold, then the user is forced to select a different person.

In an illustrative embodiment, an Internet or other database search is run, and all matching images for the search string are returned. The system may then use facial detection software and crop images to only contain the face and upper torso. The user may select one image of the target for display in passcode gallery 206, and the system then creates a person template for the selected individual. Specifically, the system may tag the person with defining characteristics, such as name, ethnicity, gender, hair color, nose position on a face, eye position on the face, and perhaps many other tags or descriptors. Collectively this information may be referred to as the person template.

The above process repeats for each person entered into passcode gallery 206. The user may, optionally, be given the ability to add or remove persons from passcode gallery 206. The identities of the persons in passcode gallery 206 are then used to generate challenge palettes.

Figure 3:
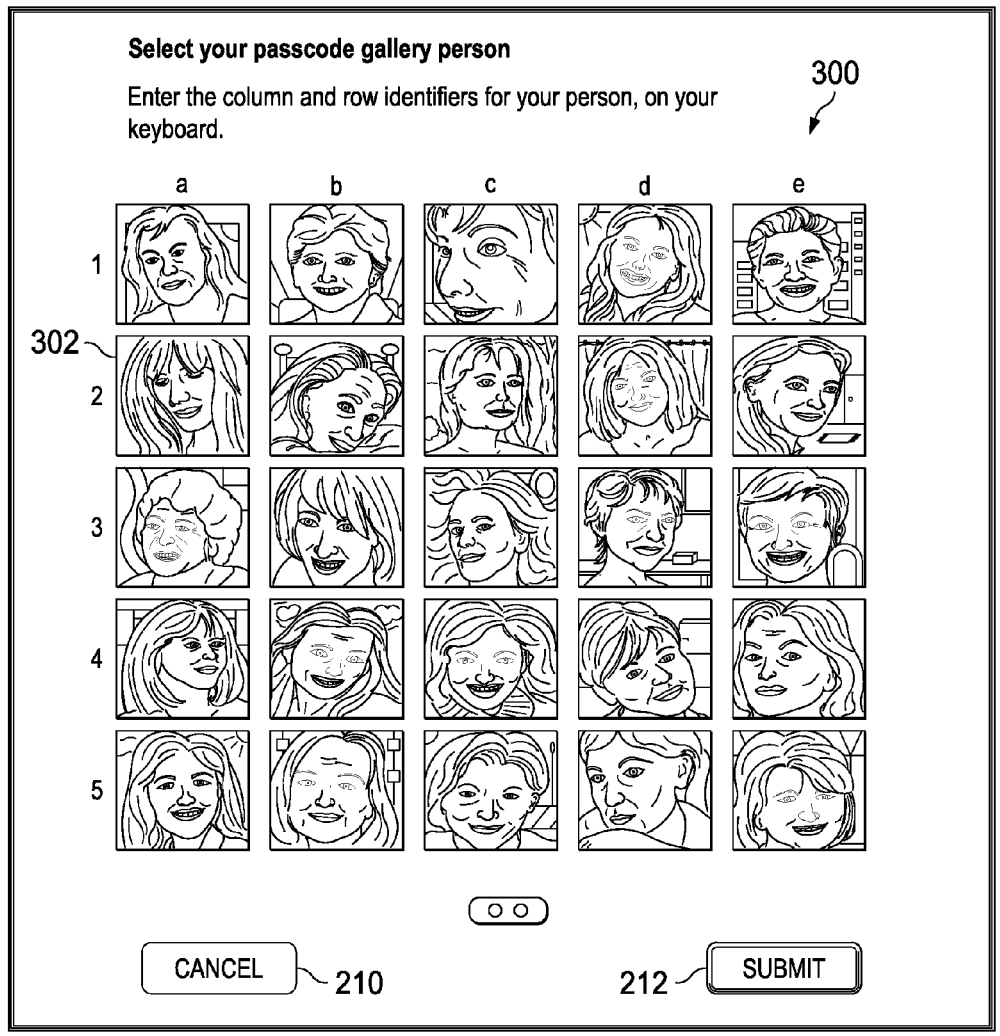
FIG. 3 is an illustration of a palette of human faces that are similar to the face of the person selected with respect to FIG. 2, where the face of the selected person is different than that shown in FIG. 2, the palette being presented to a user, in accordance with an illustrative embodiment.

FIG. 3 is an illustration of a palette of human faces that are similar to the face of the person selected with respect to FIG. 2, where the face of the selected person is different than that shown in FIG. 2, the palette being presented to a user, in accordance with an illustrative embodiment. FIG. 3 may represent a second step in establishing a computer security scheme to secure computer resources, in accordance with an illustrative embodiment. The techniques described with respect to FIG. 3 may be implemented by a data processing system, such as data processing system 600 of FIG. 6. As used herein the term "the system" may refer to some or all of such a data processing system, including data processing system 600 of FIG. 6.

FIG. 3 shows a computer security system in use. The technique described with respect to FIG. 3 assumes that a passcode gallery has been created, such as described with respect to FIG. 2. However, other methods could be used to generate a passcode gallery, as described above.

When a user attempts to access a secured computer resource, the user is presented with challenge palette 300. A picture of one of the persons in passcode gallery 206 of FIG. 2 is shown. In this particular example, facial image 302 of FIG. 3 belongs to the same person as facial image 214 of FIG. 2. However, facial image 302 is considerably different than facial image 214. These two images are separated in time, have different facial positions, and visibility of the eyes. Identifying that facial image 302 refers to the same person as facial image 214 is difficult for most individuals, unless that person is familiar to the user.

Note that the system finds and presents facial image 302 in real time. Thus, when the user attempts to gain access to the secured resource, the system performs an Internet or other database search based on the identity of the corresponding person in the passcode gallery using descriptors in a person template, as described with respect to FIG. 2. The system may verify the entity of the person represented by facial image 302 to confirm that the person shown in facial image 214 is the same as the person shown in facial image 302.

Challenge palette 300 also includes one or more distractor images. A distractor image is a facial image of a person other than the person in the passcode gallery. The distractor images are preferably similar to facial image 302 to increase the difficulty of identifying the correct facial image 302 to all but users who are familiar with or know the person identified in the passcode gallery. The example challenge palette 300 shown in FIG. 3 has 24 distractor images along with the correct image, arranged in a 5×5 grid. More or fewer distractor images may be present. More or fewer challenge palettes may be present, with the user having to first pick the challenge palette that could contain the correct facial image.

To gain access to the secured resource, the user must select the correct facial image, facial image 302. In some illustrative embodiments, the user may select a facial image by clicking on the selected facial image. In some illustrative embodiments, the user may select a facial image by typing in a sequence of letters and numbers that indicate which image is selected. For example, in challenge palette 300, the user could type "2a" or "a2" to indicate that the facial image corresponding to row 2, column "a" is selected. Other identification and entry schemes are possible. For example, challenge palette 300 need not be a grid, but could be a circular palette that the user may spin until the desired facial image is beneath a pointer. Additionally, more or fewer distractor images may be present. Thus, the illustrative embodiments are not necessarily limited to the specific example shown in FIG. 3.

If the user selects a distractor image, then access to the secured resource is not granted. In some illustrative embodiments, the user may be locked out if the user fails identify the correct facial image. In some illustrative embodiments, the user may be locked out if the user fails to identify the correct facial image after a threshold number of attempts. If the user is locked out, then the user will no longer be able to make attempts to gain access to the secured computer resource.

If a user is locked out, then the user may have to pass a higher level of security in order to make additional attempts to gain access to the secured computer resource. For example, an administrator may need to be contacted to unlock the challenge, a new challenge palette based on a different person in the passcode gallery may be generated, the user may be required to contact a call center and offer additional proof that the user is authorized to access the secured computer resource, or any other suitable additional level of security may be required in order to make another attempt at challenge palette 300.

Attention is now turned to how the distractor images may be generated. In an illustrative embodiment, upon a request to access to secure computer resources, the system may search for images of other people that have appear similar to the pre-selected person in the passcode gallery. Thus, for example, the system would search, in real time, for people who had facial characteristics similar to those of the person shown in facial image 214 of FIG. 2. Note that the illustrative embodiments are not limited to just looking for similar facial characteristics, rather the illustrative embodiments preferably look to identities of persons who have similar characteristics.

Specifically, the illustrative embodiments may make variations to the person template of the person represented by facial image 214. The system may then search the Internet or other databases for the identities of individuals that match or closely match the changed person template. The system may then find facial images of these other individuals who have characteristics similar to the person template of the person represented by facial image 214. The facial images of these other persons then form the distractor images shown in challenge palette 300.

Alternatively, the illustrative embodiments may use facial image properties of facial image 214, and then conduct a search based on those facial image properties. The facial images of having similar, but different, facial image properties are then presented to the user as distractor images in challenge palette 300.

In this manner, challenge palette 300 will confront the user with one facial image of the person shown in facial image 214, but that is different than facial image 214, plus many distractor images of people that look at least somewhat alike the person represented by facial image 214. As described above, it has been shown that people who are unfamiliar with the person represented by facial image 214 will have a hard time selecting the different image of that person from among distractor images of similar looking persons. In contrast, people familiar with the person represented by facial image 214 will usually correctly select the facial image of the person in the passcode gallery, even though facial image 302 is significantly different than facial image 214.

Stated differently, at authentication, the system may retrieve a person template to be used for authentication trial. The system then may perform a web image search, using all template values for a one-one search match. Information may be taken from the retrieved image, such as the image color space, proportional measurements of facial images of the retrieved image, and other tags that may be present in the person template. The system then performs a web image search with the following tags: equals facial information, equals image information, does not equal indicative data such as last name, and does not equal a feature point set of the facial image from the passcode gallery. The system then crops retrieved images to include head and upper shoulders. The system displays cropped images in a matrix, along with a different facial image of the same person in the passcode gallery, with ordering of images randomized.

The illustrative embodiments have several advantages over the known art. For example, using the illustrative embodiments, the user provides the universe of potential targets used in the passcode gallery. Thus, the user is not constrained to choosing from a fixed set of images and then memorizing these images. Additionally, the user's memory of faces for chosen targets uses the well-established ability of humans to recognize even the modified images of people whom they know well. Thus, setting up the passcode gallery is simple, and remembering the facial images used in the passcode requires very little user effort to memorize. Still further, target facial images presented at login are varied but still recognizable to the user. Further yet, the illustrative embodiments do not suffer from the security disadvantage of using exactly the same image of a face or other object as established at security setup.

The illustrative embodiments thus provide more control over the user's target person selection, ensuring a familiarity threshold for a particular individual user that the user knows well, but is unfamiliar to others. The illustrative embodiments reduce distinctiveness between target and distractor images by insuring that both share important features, such as ethnicity, gender, hair color, age, and possibly other features. The illustrative embodiments may fine-tune the target selection process by changing the portfolio of individuals stored in the passcode gallery. The illustrative embodiments may fine tune the authentication process by increasing the number of matrix distractors, and presented matrices, while keeping the login time to a minimum. Thus, for example, the illustrative embodiments may present multiple challenge palettes in addition to challenge palette 300, with the user having to select a palette first before selecting a particular facial image from challenge palette 300. The other palettes, for example, could show only distractor images, could show facial images of people other than a person whose identity is stored in the passcode gallery, or could show other facial images, possibly even random facial images. Generally, increasing the number of challenge palettes and/or the number of facial images increase the difficulty of successfully finding the correct facial image, and thus increase security at the expense of the speed of login.

Additional layers of security could be present. For example, the user may have to pass more than one challenge palette in order to access the secured resource. The user may have to pass several challenge steps, with each challenge step presenting multiple palettes wherein only a single one of those multiple palettes contains a single correct facial image among many distractor images. The number of identities stored in the passcode gallery may be increased, with a random identity selected for use each time a challenge palette is to be generated. With respect to using an alphanumeric entry based on row and column identifiers, such as shown in FIG. 3, decoy characters could be inserted into the user entry on submit in order to make detection of the actual target more difficult for malware attacks.

Other variations are possible. Thus, the illustrative embodiments are not necessarily limited to those described above with respect to FIG. 2 or FIG. 3.

Figure 4:
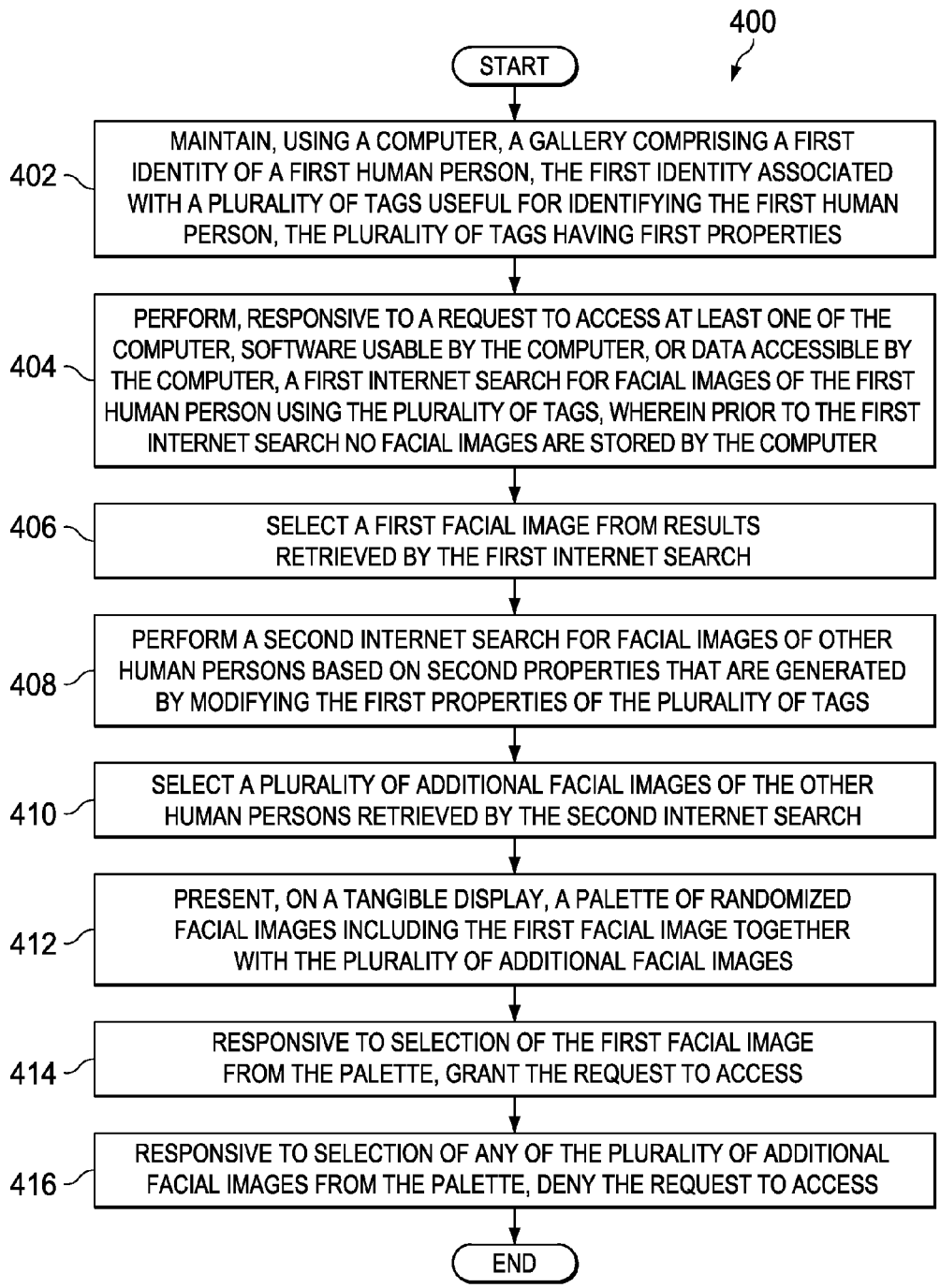
FIG. 4 is a flowchart of a process for computer security, in accordance with an illustrative embodiment.

FIG. 4 is a flowchart of a process for computer security, in accordance with an illustrative embodiment. Method 400 may be implemented by one or more data processing systems, such as but not limited to data processing system 600 of FIG. 6. Method 400 may be a variation of the techniques described above with respect to FIG. 2 and FIG. 3. Method 400 refers to "the system" performing the recited operations.

With respect to FIG. 4, the term "the system" is defined as only hardware, possibly operating according to instructions provided by computer usable program code stored on a non-transitory computer readable storage medium, but possibly implemented strictly using instructions implemented as application specific integration circuits.

In an illustrative embodiment, method 400 begins by the system maintaining, using a computer, a gallery comprising a first identity of a first human person, the first identity associated with a plurality of tags useful for identifying the first human person, the plurality of tags having first properties (operation 402). The system then performs, responsive to a request to access at least one of the computer, software usable by the computer, or data accessible by the computer, a first Internet search for facial images of the first human person using the plurality of tags, wherein prior to the first Internet search no facial images are stored by the computer (operation 404).

Next, the system selects a first facial image from results retrieved by the first Internet search (operation 406). The system then performs a second Internet search for facial images of other human persons based on second properties that are generated by modifying the first properties of the plurality of tags (operation 408). The system then selects a plurality of additional facial images of the other human persons retrieved by the second Internet search (operation 410).

Next, the system presents, on a tangible display, a palette of randomized facial images including the first facial image together with the plurality of additional facial images (operation 412). Then, responsive to selection of the first facial image from the palette, the system grants the request to access (operation 414). However, responsive to selection of any of the plurality of additional facial images from the palette, the system denies the request to access (operation 416). The process may terminate thereafter.

Method 400 may be varied. For example, prior to maintaining, the system may generate the gallery by receiving from a user an identity of the first human person. In this case, receiving the identity may be performed by performing at least one of: an Internet search of a name of the first human person, selecting a second image of the first human person, and receiving one or more facts confirming the first identity. In addition, the system may, prior to maintaining, generate a familiarity score of the first human person that is a measure of how recognizable the first human person is to a plurality of different people. In this case, the system may compare the familiarity score to a threshold value. Responsive to the familiarity score being below the threshold, the system may accept adding the first human person to the gallery.

In still another variation, the familiarity score may be generated by performing a third Internet search of the first human person's name and examining a number of hits received on that first human person's name. In yet another illustrative embodiment, the plurality of additional facial images may be tunable and may be selected by the computer to be between eight images in addition to the first facial images and thirty-five images in addition to the first facial image.

Still additional operations are possible in method 400. For example, method 400 may also include, prior to maintaining, generating the gallery by receiving from a user a plurality of identities of a plurality of human persons, among which is the first identity of the first human person. In this case, method 400 may also include in the gallery all of the plurality of identities, the plurality of identities associated with pluralities of tags useful for identifying the pluralities of human persons, the pluralities of tags having corresponding properties.

In yet another variation of method 400, the system may, prior to performing the first Internet search, randomly select the first identity from among the plurality of identities. Thus, many variations of method 400 may be possible. Accordingly, the illustrative embodiments are not necessarily limited by the specific examples described with respect to FIG. 4.

Figure 5:
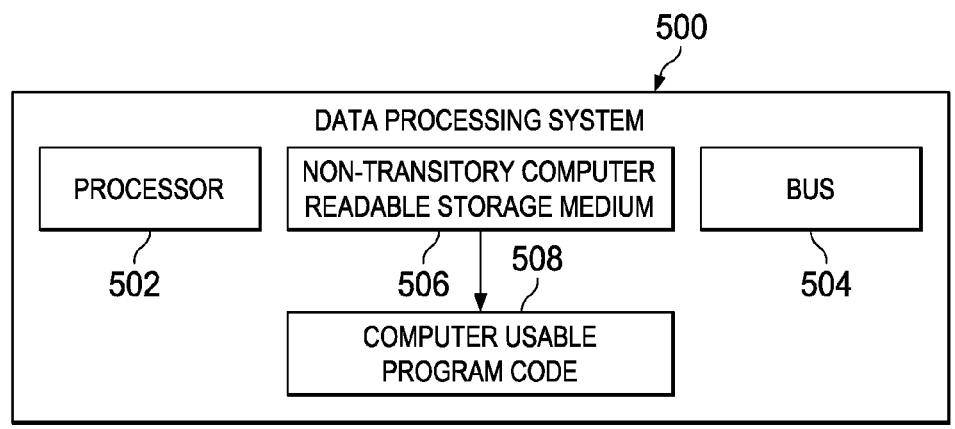
FIG. 5 is a block diagram of a data processing system for implementing computer security, in accordance with an illustrative embodiment.

FIG. 5 is a block diagram of a data processing system for implementing computer security, in accordance with an illustrative embodiment. Data processing system 500 of FIG. 5 is an entirely hardware embodiment. Data processing system 500 may be used to implement the techniques described above with respect to FIG. 2 through FIG. 4. Data processing system 500 may be considered a special purpose version of data processing system 600 of FIG. 6.

Data processing system 500 may include processor 502, bus 504 connected to the processor, and non-transitory computer readable storage medium 506 connected to bus 504. Non-transitory computer readable storage medium 506 may store computer usable program code 508 which, when executed by processor 502, performs a method implemented by data processing system 500.

Computer usable program code 508 may be computer usable program code for maintaining, using a computer, a gallery comprising a first identity of a first human person, the first identity associated with a plurality of tags useful for identifying the first human person, the plurality of tags having first properties. Computer usable program code 508 may further include computer usable program code for, responsive to a request to access at least one of the computer, software usable by the computer, or data accessible by the computer, the computer performing a first Internet search for facial images of the first human person using the plurality of tags, wherein prior to the first Internet search no facial images are stored by the computer.

Computer usable program code 508 may further include computer usable program code for selecting, by the computer, a first facial image from results retrieved by the first Internet search. Computer usable program code 508 may further include computer usable program code for performing, by the computer, a second Internet search for facial images of other human persons based on second properties that are generated by modifying the first properties of the plurality of tags.

Computer usable program code 508 may further include computer usable program code for selecting, by the computer, a plurality of additional facial images of the other human persons retrieved by the second Internet search. Computer usable program code 508 may further include computer usable program code for presenting, on a tangible display, a palette of randomized facial images including the first facial image together with the plurality of additional facial images.

Computer usable program code 508 may further include computer usable program code for, responsive to selection of the first facial image from the palette, granting the request to access. Computer usable program code 508 may further include computer usable program code for, responsive to selection of any of the plurality of additional facial images from the palette, denying the request to access.

Other variations are possible. For example, computer usable program code 508 may further include computer usable program code for, prior to maintaining, generating the gallery by receiving from a user an identity of the first human person. In an illustrative embodiment, the computer usable program code for receiving the identity includes computer usable program code for performing at least one of: an Internet search of a name of the first human person, selecting a second image of the first human person, and receiving one or more facts confirming the first identity.

In another illustrative embodiment, computer usable program code 508 may further include computer usable program code for, prior to maintaining, generating a familiarity score of the first human person that is a measure of how recognizable the first human person is to a plurality of different people. In this case, computer usable program code 508 may further include computer usable program code for, comparing the familiarity score to a threshold value. Additionally, computer usable program code 508 may further include computer usable program code for, responsive to the familiarity score being below the threshold, accepting adding the first human person to the gallery.

In another illustrative embodiment, the familiarity score is generated by computer usable program code for performing a third Internet search of the first human person's name and computer usable program code for examining a number of hits received on that first human person's name. In another illustrative embodiment, the plurality of additional facial images is tunable and is selected by the computer to be between eight images in addition to the first facial images and thirty-five images in addition to the first facial image.

In still another illustrative embodiment, computer usable program code 508 may further include computer usable program code for, prior to maintaining, generating the gallery by receiving from a user a plurality of identities of a plurality of human persons, among which is the first identity of the first human person. In this case, computer usable program code 508 may further include computer usable program code for including in the gallery all of the plurality of identities, the plurality of identities associated with pluralities of tags useful for identifying the pluralities of human persons, the pluralities of tags having corresponding properties.

In yet another illustrative embodiment, computer usable program code 508 may further include computer usable program code for, prior to performing the first Internet search, randomly selecting the first identity from among the plurality of identities. Thus, many variations are possible. In still other variations, the illustrative embodiments may take the form of a non-transitory computer readable storage medium storing computer usable program code, such as those described above with respect to FIG. 5. Accordingly, the illustrative embodiments are not necessarily limited to the examples provided in FIG. 5.

In summary, the illustrative embodiments provide several advantages over the known art. For example, the illustrative embodiments provide end user authentication into a secure software environment, using a knowledge-based facial recognition approach. The illustrative embodiments use an approach different than previous authentication paradigms using recognition of a facial target amongst distractor facial images. For example, end user selection of authentication targets is based on personal familiarity with a human person, not a specific image of a person. In previous approaches to facial recognition authentication, the end user was constrained to selection of individual facial images as authentication targets, provided from a fixed pool of stored images.

In further contrast, the illustrative embodiments have the end user identify a target person by name, based on their personal familiarity with that target person. The system then guides the end user to optimal target person definition, ensuring that the proposed target is relatively unfamiliar to others. This goal is accomplished by real-time web search for that person's name, and deriving a "familiarity" score. Based on a system tunable threshold value, the system indicates whether or not the proposed target will meet a desired password strength. A proposed target that meets the strength minimum is then used to display facial image examples for that target. User selection of a target image causes the system to derive a person template of facial tags, which are then stored for later use during authentication trials. Thus, the end user creates a "gallery" of target persons, large enough to allow for subset sampling during multiple authentication trials.

During each authentication trial, the set of target and distractor facial images are also constructed in real time, rather than being drawn from a stored set of images. A target person is selected at random from the end user's gallery. The stored template values are then used in a web image search to retrieve an exemplar image of the target person, along with a set of distractor facial images that match on a subset of the template value set.

Thus, the illustrative embodiments provide a more robust and secure authentication approach over previous facial recognition methods. For example, the illustrative embodiments provide for guided selection of personally familiar people for authentication targets, rather than memorization of a fixed facial image. This aspect of the illustrative embodiments improves the memorability of the target over time. This fact would be especially important for end users with infrequent log in attempts. This approach to target selection also decreases the potential for guessing attacks due to potential user choice of common facial patterns, choosing the same gender, culture, or race. Using personally familiar persons, but relatively unfamiliar to others, helps to reduce over the shoulder attacks on the end user authentication keys.

Yet further, creation of target and distractor matrices in real time reduces storage requirements for the authentication solution. Using a random sampling of targets for authentication trials, and real time retrieval of target and distractor images examples, also increases the difficulty of both online and offline attacks. Thus, the illustrative embodiments provide for a robust security solution that is also convenient for the end user.

Figure 6:
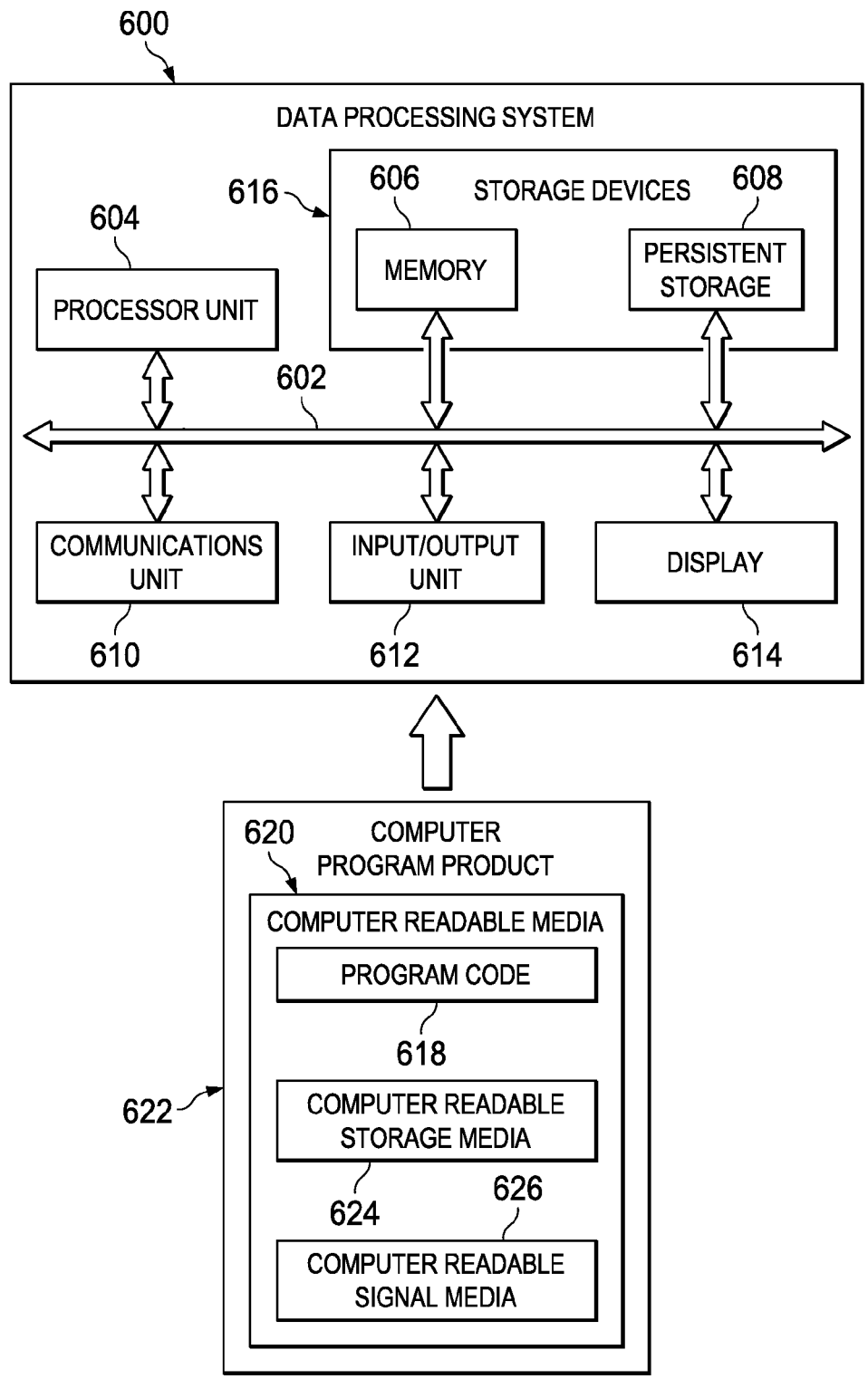
FIG. 6 illustrates a data processing system, in accordance with an illustrative embodiment.

Turning now to FIG. 6, an illustration of a data processing system is depicted in accordance with an illustrative embodiment. Data processing system 600 in FIG. 6 is an example of a data processing system that may be used to implement the illustrative embodiments, such as the interpolation methods described with respect to FIG. 1 through FIG. 5. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. This software may be an associative memory, content addressable memory, or software for implementing the processes described elsewhere herein. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for execution by processor unit 604. The processes of the different embodiments may be performed by processor unit 604 using computer implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these examples. In one example, computer readable media 620 may be computer readable storage media 624 or computer readable signal media 626. Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 618 may be omitted because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, implemented by a computer, comprising:
responsive to a request by a user to access a secured device, a computer performing a first search for facial images of a first human person using a plurality of tags, the plurality of tags having first properties related to the first human person;
selecting, by the computer, a first facial image of the first human person from results retrieved by the first search;
modifying, by the computer, the first properties of the plurality of tags to create second properties that are different from the first properties;
performing, by the computer, a second search for facial images of other human persons based on the second properties;
selecting, by the computer, a plurality of additional facial images of the other human persons retrieved by the second search;
presenting, on a physical display, a palette of randomized facial images including the first facial image together with the plurality of additional facial images;
responsive to selection by the user of the first facial image from the palette, granting the request to access the secured device; and
responsive to selection by the user of any of the plurality of additional facial images, denying the request to access the secured device.

2. The method of claim 1 further comprising:
prior to performing the first search, generating a gallery of a plurality of different facial images of the first person by receiving from the user an identity of the first human person, and then searching for the plurality of different facial images of the first person.

3. The method of claim 2, wherein searching for the plurality of different facial images of the first person is performed by at least one of: an Internet search of a name of the first human person, selecting a second image of the first human person, and receiving one or more facts confirming the identity.

4. The method of claim 2 further comprising:
prior to generating the gallery, generating a familiarity score of the first human person that is a measure of how recognizable the first human person is relative to a plurality of different people;
comparing the familiarity score to a threshold value; and
responsive to the familiarity score being below the threshold, accepting adding the first human person to the gallery.

5. The method of claim 4, wherein the familiarity score is generated by performing a third search of the first human person's name and examining a number of hits received on that first human person's name.

6. The method of claim 2 further comprising:
as part of generating the gallery, generating the gallery by receiving from the user a plurality of identities of a plurality of human persons, among which is the identity of the first human person; and
including in the gallery all of the plurality of identities, the plurality of identities associated with pluralities of tags useful for identifying the pluralities of human persons, the pluralities of tags having corresponding properties.

7. The method of claim 6 further comprising:
prior to performing the first search, randomly selecting the first identity from among the plurality of identities.

8. The method of claim 1, wherein the plurality of additional facial images is tunable and is selected by the computer to be between eight images in addition to the first facial images and thirty-five images in addition to the first facial image.

9. A computer comprising:
a hardware processor; and
a memory connected to the processor, the memory comprising a non-transitory computer recordable storage medium and storing program code which, when implemented by the processor, performs a computer-implemented method, the program code comprising:
computer usable program code for, responsive to a request by a user to access a secured device, a computer performing a first search for facial images of a first human person using a plurality of tags, the plurality of tags having first properties related to the first human person;
computer usable program code for selecting, by the computer, a first facial image of the first human person from results retrieved by the first search;
computer usable program code for modifying, by the computer, the first properties of the plurality of tags to create second properties that are different from the first properties;
computer usable program code for performing, by the computer, a second search for facial images of other human persons based on the second properties;
computer usable program code for selecting, by the computer, a plurality of additional facial images of the other human persons retrieved by the second search;
computer usable program code for presenting, on a physical display, a palette of randomized facial images including the first facial image together with the plurality of additional facial images;
computer usable program code for responsive to selection by the user of the first facial image from the palette, granting the request to access the secured device; and
computer usable program code for, responsive to selection by the user of any of the plurality of additional facial images, denying the request to access the secured device.

10. The computer of claim 9 wherein the program code further comprises:
   computer usable program code for, prior to performing the first search, generating a gallery of a plurality of different facial images of the first person by receiving from the user an identity of the first human person, and then searching for the plurality of different facial images of the first person.

11. The computer of claim 10, wherein the computer usable program code for searching for the plurality of different facial images of the first person is performed by computer usable program code for searching at least one of: an Internet search of a name of the first human person, selecting a second image of the first human person, and receiving one or more facts confirming the identity.

12. The computer of claim 10 wherein the program code further comprises:
   computer usable program code for, prior to generating the gallery, generating a familiarity score of the first human person that is a measure of how recognizable the first human person is relative to a plurality of different people;
   computer usable program code for comparing the familiarity score to a threshold value; and
   computer usable program code for responsive to the familiarity score being below the threshold, accepting adding the first human person to the gallery.

13. The computer of claim 12, wherein the familiarity score is generated by computer usable program code for performing a third search of the first human person's name and computer usable program code for examining a number of hits received on that first human person's name.

14. The computer of claim 10, wherein the program code further comprises:
   computer usable program code for as part of generating the gallery, generating the gallery by receiving from the user a plurality of identities of a plurality of human persons, among which is the identity of the first human person; and
   computer usable program code for including in the gallery all of the plurality of identities, the plurality of identities associated with pluralities of tags useful for identifying the pluralities of human persons, the pluralities of tags having corresponding properties.

15. The computer of claim 14, wherein the program code further comprises:
   computer usable program code for prior to performing the first search, randomly selecting the identity from among the plurality of identities.

16. The computer of claim 9, wherein the plurality of additional facial images is tunable and is selected by the computer to be between eight images in addition to the first facial images and thirty-five images in addition to the first facial image.

17. A method, implemented over a computer network, comprising:
   responsive to a request by a user to access a remote secured device at a remote location, performing, by a server computer, a first search for facial images of a first human person using a plurality of tags, the plurality of tags having first properties related to the first human person;
   selecting, by the server computer, a first facial image of the first human person from results retrieved by the first search;
   modifying, by the server computer, the first properties of the plurality of tags to create second properties that are different from the first properties;
   performing, by the server computer, a second search for facial images of other human persons based on the second properties;
   selecting, by the server computer, a plurality of additional facial images of the other human persons retrieved by the second search;
   transmitting, by the server computer to the remote location, a palette of randomized facial images including the first facial image together with the plurality of additional facial images; and
   receiving, by the server computer from the remote location, a user selection of the first facial image from the palette, thereafter transmitting, by the server computer, a code to grant access to the remote secured device; or
   receiving, by the server computer from the remote location, a user selection of any of the plurality of additional facial images from the palette, thereafter transmitting, by the server computer, a code to deny access to the remote secured device.

18. The method of claim 17 further comprising:
   prior to performing the first search, generating, by the server computer, a gallery of a plurality of different facial images of the first person by receiving from the user an identity of the first human person, and then searching for the plurality of different facial images of the first person.

* * * * *